United States Patent
Tzschichholtz et al.

(10) Patent No.: US 11,126,811 B2
(45) Date of Patent: Sep. 21, 2021

(54) PIECE GOODS REGISTRATION ARRANGEMENT

(71) Applicant: Deutsche Post AG, Bonn (DE)

(72) Inventors: Ingo Tzschichholtz, Frankfurt am Main (DE); Guido Bais, Königswinter (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 17/096,273

(22) Filed: Nov. 12, 2020

(65) Prior Publication Data
US 2021/0142017 A1    May 13, 2021

(30) Foreign Application Priority Data
Nov. 13, 2019   (DE) ...................... 10 2019 130 572.1

(51) Int. Cl.
*G06K 7/10*        (2006.01)
*G06K 7/14*        (2006.01)

(52) U.S. Cl.
CPC ..... *G06K 7/10722* (2013.01); *G06K 7/10861* (2013.01); *G06K 7/1413* (2013.01); *G06K 7/1417* (2013.01); *G06K 2007/10504* (2013.01)

(58) Field of Classification Search
CPC .......... G06K 7/10722; G06K 7/10861; G06K 7/1404; G06K 7/1413; G06K 7/1417; G06K 2007/10504
See application file for complete search history.

(56) References Cited

U.S. PATENT DOCUMENTS

| | | | | |
|---|---|---|---|---|
| 5,708,470 | A * | 1/1998 | Holford | H04N 7/18 348/143 |
| 10,022,752 | B1 * | 7/2018 | Rothermel | B07C 3/08 |
| 10,807,808 | B1 * | 10/2020 | Rodgers | B25J 9/0093 |
| 2019/0160493 | A1 | 5/2019 | Garrett et al. | |
| 2020/0094288 | A1 | 3/2020 | Coupar et al. | |

FOREIGN PATENT DOCUMENTS

| | | |
|---|---|---|
| DE | 29520500 U1 | 4/1996 |
| DE | 19909518 A1 | 10/1999 |
| DE | 102010014105 A1 | 10/2011 |
| JP | S60112521 A | 6/1985 |

OTHER PUBLICATIONS

German Office Action (with English Translation) DE102019130572.1, dated Oct. 21, 2020 (14 pages).

* cited by examiner

*Primary Examiner* — Laura A Gudorf
(74) *Attorney, Agent, or Firm* — Dority & Manning, P.A.

(57) ABSTRACT

A package unit capturing arrangement includes a belt conveyor for transporting a package unit having an identification marking along a conveying direction and includes an optical sensor. The belt conveyor has, parallel to the conveying direction, a sideguard for preventing the packing unit from falling off a belt of the belt conveyor. The sideguard is designed to have a grate in a region. The sensor is arranged laterally with respect to the belt and behind the grate on a side of the sideguard facing away from the belt so that the belt and the grate lie in a field of view of the sensor. A depth of field region of the sensor is narrower than a width of the belt, with the result that the identification marking of the packing unit is optically capturable by the sensor.

14 Claims, 3 Drawing Sheets

```
┌─────────────────────────────────────────┐
│ Arranging an optical sensor laterally   │
│ with respect to the belt and behind the │
│ grate on a side of the sideguard facing │
│ away from the belt such that the belt   │
│ and the grate lie in a field of view    │
│ of the sensor                           │
└─────────────────────────────────────────┘
```

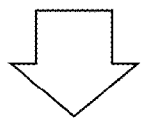

```
┌─────────────────────────────────────────┐
│ Setting a depth of field region of the  │
│ sensor such that the depth of field     │
│ region is narrower than a width of the  │
│ belt                                    │
└─────────────────────────────────────────┘
```

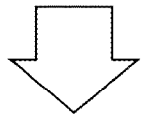

```
┌─────────────────────────────────────────┐
│ Capturing the identification marking of │
│ the package unit by means of the sensor │
└─────────────────────────────────────────┘
```

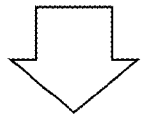

```
┌─────────────────────────────────────────┐
│ Recognizing the identification marking  │
│ by means of an evaluation device        │
└─────────────────────────────────────────┘
```

Fig. 6

PIECE GOODS REGISTRATION ARRANGEMENT

CROSS-REFERENCE TO RELATED APPLICATION

The present application is related and has right of priority to German Patent Application No. 10 2019 130 572.1 filed on Nov. 13, 2019, which is incorporated by reference in its entirety for all purposes.

FIELD OF THE INVENTION

The invention relates generally to a packing unit capturing arrangement including a belt conveyor for transporting a packing unit along a conveyer direction and an optical sensor. The invention furthermore relates generally to a method for the automated recognition of an identification marking of the packing unit.

BACKGROUND

In distribution and sorting centres, belt conveyors are generally used to transport packing units. The packing units in such installations are sorted often based on an identification marking that has been applied on the packing unit.

Due to standards, laws or guidelines, such as due to the machinery Directive 2006/42/EC, operators of machinery and installations must be protected from hazards generated by moving parts by way of appropriate protective measures. Protection of the operators can be implemented in the case of belt conveyors by what are known as sideguards, which laterally enclose the hazardous region within which the belt conveyor is located. The sideguards can at the same time prevent packing units from falling off the belt.

For sorting the packing units, it is known to equip installations with sensors that permit the automatic capturing of the packing units. The sensors are generally arranged in the immediate vicinity of the belt of the belt conveyor, because a direct line of sight from the sensor to the packing units on the belt is realized hereby and the sideguards or other protective measures do not block the view at the packing units. This arrangement often leads to a complicated and space-demanding construction of the protective measures. Furthermore, this arrangement means that the sensors are placed inside the hazardous region. The result of this is that the installation must generally be switched off for maintenance and service measures of the sensors to take place because the sensors are accessible only when a maintenance and service worker enters the hazardous region.

SUMMARY OF THE INVENTION

Proceeding from this situation, example aspects of the invention provide a packing unit capturing arrangement and a method for the automated recognition of an identification marking of a packing unit, which does not have the above disadvantages. In particular, example aspects of the invention provide a packing unit capturing arrangement and a corresponding method that does not pose any danger to operators and permits the maintenance of the sensors without the belt conveyor being switched off.

Accordingly, a packing unit capturing arrangement, includes a belt conveyor for transporting a packing unit having an identification marking along a conveying direction and including an optical sensor, wherein the belt conveyor has, parallel to the conveying direction, a sideguard for preventing the packing unit from falling off a belt of the belt conveyor. The sideguard is designed to have a grate in a region. The sensor is arranged laterally with respect to the belt and behind the grate on a side of the sideguard facing away from the belt so that the belt and the grate lie in a field of view of the sensor. A depth of field region of the sensor is narrower than a width of the belt, with the result that the identification marking of the packing unit is optically capturable by the sensor.

One beneficial aspect of the solution proposed is that a) a region of the sideguard is designed as a grate and b) the depth of field region of the optical sensor is narrower than a width of the belt. Attempts were made in the prior art to arrange the optical sensor outside the hazardous region, in other words to arrange the sensor laterally with respect to the belt and behind the sideguard on a side of the sideguard facing away from the belt and to capture the identification marking of the packing unit on the belt through a gap in the sideguard in a manner such that, for example, the field of view of the sensor matches the gap in the sideguard. However, such an arrangement requires the positioning of the sensor relative to the gap to be extremely precise. Such an arrangement furthermore leads to the gap, owing to its small permissible size, acting as a stop for the optical sensor, which stop reduces the quantity of light that is incident on the optical sensor and thereby makes the capturing of the identification marking more difficult.

In the arrangement according to example aspects of the invention, by contrast, the packing unit is not captured through a gap in the grate, but rather the sensor is arranged such that the grate lies in the field of view of the sensor. The result of this is that the stop effect described above does not occur and a high quantity of light is incident on the sensor. However, in this arrangement, it is not only the belt on which the packing unit is transported that is imaged on an optical representation generated by the sensor but also the grate, since the latter lies in the field of view of the sensor. Owing to the fact that the depth of field region of the sensor is narrower than the width of the belt, the depth of field region of the sensor is restricted to the belt during focusing on a belt centre. With preference, the depth of field region of the optical sensor is narrower than eighty percent (80%) of the width of the belt, with further preference narrower than fifty percent (50%) of the width of the belt and with particular preference narrower than thirty percent (30%) of the width of the belt. This leads to the identification marking of the packing unit on the belt being optically capturable by the sensor despite the grate being in the field of view of the sensor. By restricting the depth of field region to the belt, the grate is imaged in a blurred manner on the optical imaged representation, allowing the identification marking of the packing unit to be recognized on the optical imaged representation despite the grate.

The packing unit capturing arrangement includes the belt conveyor for transporting the packing unit along the conveying direction. The packing unit is preferably cargo that can be transported piece-wise. With particular preference, said piece or unit is a parcel and/or package. The packing unit has an identification marking, wherein the packing unit can preferably be identified and/or sorted based on the identification marking. For example, the identification marking can be a barcode or delivery address.

The packing unit is preferably transported on the belt of the belt conveyor. The extent of the belt perpendicular to the conveying direction preferably corresponds to the width of the belt. The belt conveyor can be any conveying installation or any type of continuous conveyor allowing the transporting of the packing unit. Within the meaning of the invention, belt conveyor is also to be understood to mean a chain conveyor, sorter, tilt tray sorter, crossbelt sorter or roller conveyor, wherein in the case of a roller conveyor or chain conveyor the packing unit is not transported on a belt but rather over an arrangement of rollers or on pallets or in boxes. For such belt-less conveying installations, a belt within the meaning of the invention is understood to mean the apparatus on which the packing unit is placed while being transported by the conveying installation. In particular, belt also refers to the region of the conveying installation and/or of the belt conveyor in which the packing unit can be located as it is transported by the conveying installation and/or belt conveyor. Furthermore, width of the belt in belt-less conveying installations is in particular understood to means the extent of said region perpendicular to the transport device.

The belt conveyor has, parallel to the conveying direction, a sideguard with the purpose of preventing the packing unit from falling off the belt of the belt conveyor. The sideguard preferably takes the form of a wall that is situated laterally with respect to the belt and extends substantially at a right angle relative to the plane of the belt. With further preference, the sideguard allows operators of belt conveyors to be protected from danger posed by the belt conveyor. The sideguard is preferably designed such that the sideguard meets the requirements of fixed, separating protective devices according to Directive 2006/42/EC.

The packing unit capturing arrangement furthermore includes the optical sensor. An optical sensor within the meaning of the invention is understood to mean a sensor designed to generate an optical imaged representation of the environment in the field of view of the sensor, in particular using electromagnetic radiation. The optical sensor preferably includes an illumination device for increasing the quantity of light that is present. With further preference, the optical sensor operates in a wavelength range of the electromagnetic radiation from four hundred (400) to eight hundred (800) nanometers (nm). The optical sensor is arranged laterally with respect to the belt and behind the sideguard on the side of the sideguard facing away from the belt, that is to say outside the hazardous region. Furthermore, the optical sensor is arranged such that the grate and the belt lie in the field of view of the optical sensor. Owing to the grate, the optical sensor can capture the identification marking of the packing unit on the belt of the belt conveyor. For this purpose, the depth of field region of the sensor is preferably restricted to the belt when focusing on the belt centre.

The optical sensor can reproduce in principle only the points of the environment that lie on a focal plane located in the object distance from the lens as sharp image points in the optical imaged representation. All other points located on planes that lie closer or farther away no longer appear as image points in the optical imaged representation but as circles of confusion. The farther from the focal plane the plane lies, the greater will the circles of confusion be. Points of the environment lying close together and not in the focal plane are imaged by circles of confusion that lie close together, overlap one another and mix in the peripheral regions, generating a blurry optical imaged representation. However, as long as the diameters of the circles of confusion are smaller than a resolution of the optical sensor, the optical representation continues to be perceived as sharp. This gives the impression that the optical imaged representation not only has a plane of sharpness, i.e. the focal plane, but also a region of sharpness, i.e. the depth of field region. The depth of field region thus denotes the region of the field of view of the sensor within which a sufficiently sharp optical imaged representation can be generated by the sensor. Sufficiently sharp in this context preferably means that the blur of the optical imaged representation within the depth of field region of the sensor is not greater than the resolution of the optical sensor. With particular preference, sufficiently sharp in this context means that the blur of the optical imaged representation within the depth of field region of the sensor is sufficient so that the identification marking of the packing unit on the optical imaged representation is recognizable, preferably in automated fashion by an evaluation device.

For the purposes of capturing the identification marking of the packing unit, the sideguard is designed as a grate in one region. The region in which the sideguard is designed as a grate can in principle have an arbitrary size. However, it is preferred that the region in which the sideguard is designed as a grate is not longer than one-half (0.5), three-tenths (0.3) or or one-tenth (0.1) metres, wherein this refers to the length parallel to the conveying direction of the belt conveyor. With respect to the height of the grate, that is to say the extent at right angles relative to the plane of the belt, it is preferred that at least fifty percent (50%) of the height of the sideguard is designed as a grate. The sideguard preferably also meets the requirements for fixed separating protective devices according to Directive 2006/42/EC in the region of the grate. A grate within the meaning of the invention is preferably understood to mean a device that is optically transparent in some locations. For example, it may be a perforated plate, a wire mesh fence or a grille. The optically transparent locations, for example the gaps and/or holes, can have a regular or irregular arrangement.

The packing unit capturing arrangement according to example aspects of the invention is particularly suitable for the automated capturing of the identification marking of the packing unit and in particular for the automated recognition of the identification marking of the packing unit. It has the advantage that the operation of the belt conveyor need not be interrupted even for maintenance of the sensor of the packing unit capturing arrangement.

According to a preferred example development, the grate in the field of view of the sensor has optically non-transparent structures, wherein the optically non-transparent structures preferably do not cover more than twenty percent (20%) of the field of view of the sensor. The grate is preferably formed not from an optically transparent material but from an optically dense material so that the grate has optically non-transparent structures. The optically non-transparent structures are, for example, the wires of the wire mesh fence or the plate of the perforated plate. If the depth of field region of the sensor were not restricted to the belt but be set such that the grate were imaged sufficiently sharply on the optical imaged representation, said optically non-transparent structures would preferably cover no more than twenty percent (20%) of the image area of the optical imaged representation. In other words, the grate is preferably configured such that, with respect to the field of view of the sensor, the optically non-transparent structures cover no more than twenty percent (20%) of the field of view of the sensor. In this way, the quantity of light kept away from the sensor by the optically non-transparent structures is relatively small. Such a grate allows a sufficiently high quantity of light to pass through so that the identification marking of the packing unit is recognizable on the optical imaged representation.

With respect to the configuration of the grate, a further preferred development makes provision that the grate in the field of view of the sensor has optically non-transparent structures that have an extent of less than one-half centimetre (0.5 cm), one centimetre (1 cm) or two centimetres (2 cm). Extent of the optically non-transparent structures is preferably understood to mean the shortest distance between two adjacent optically transparent locations of the grate. The extent of the optical structures, which are smaller than two centimetres (2 cm), can be for example the thickness of the wires of the wire mesh fence. The optically non-transparent structures are thus preferably relatively narrow. In combination with the depth of field region that is limited to the belt during focusing on the belt centre, this results in the optically non-transparent structures being represented on the optical imaged representation in a blurred manner such that the identification marking represented therebehind on the optical imaged representation is easily recognizable on the optical imaged representation.

According to a further example development, provision is made that the grate in the field of view of the sensor includes no optically transparent material. As already mentioned, the grate is preferably a device that is optically transparent in some locations. Said optically transparent locations are, with further preference, formed in a material-less manner, that is to say as gaps and/or holes, and not formed by optically transparent material. Optically transparent material such as acrylic glass or glass has the disadvantage that it scratches over time and loses its optical transparency. Optically transparent materials furthermore have the disadvantage that undesirable reflections occur that make it more difficult to capture the identification marking. Both disadvantages can be avoided by designing the optically transparent locations of the grate in the form of material-less locations.

As already mentioned, the fact that the depth of field region of the sensor is narrower than the width of the belt has the result that during focusing for example onto the belt centre, the depth of field region of the optical sensor is restricted to the belt. The focal point can be different depending on the position of the packing unit. The closest distance of the focal region preferably lies behind the grate. The grate is thus imaged in a blurred manner on the optical imaged representation, as a result of which the identification marking of the packing unit, which is imaged sufficiently sharply on the optical imaged representation, can be recognized. However, if the packing unit is not located in the belt centre and thus at a distance from the grate but is located at the belt periphery and directly behind the grate, focusing the optical sensor at the package unit can have the result the grate likewise falls into the depth of field region of the sensor and is imaged sufficiently sharply in the optical imaged representation. The result of this would be that the identification marking on the optical imaged representation is covered by the grate that is represented sufficiently sharply and no longer can be recognized. Proceeding from this problem, one preferred example development of the invention makes provision that the grate in the field of view of the sensor is interrupted by a gap. If the packing unit is then located at the belt periphery and, from the view of the sensor, directly behind the grate, the identification marking of the packing unit is not covered by the grate because of the gap in the grate. As a result, the identification marking of the packing unit is recognizable on the optical imaged representation even in this case. The gap in the grate furthermore leads to the quantity of light that is incident on the optical sensor being increased further, which also makes capturing the identification marking of the packing unit easier even when focusing in the belt centre. The gap is preferably formed in the grate such that the sideguard meets the requirements of fixed separating protective devices according to Directive 2006/42/EC even with a gap.

With respect to the configuration of the optical sensor, provision is made according to a preferred example development of the invention that the optical sensor is a camera. The camera is preferably configured to generate the optical imaged representation of the environment in the field of view of the camera. With particular preference, the camera is a line-scan camera. A line-scan camera is preferably a camera having a light sensor that has only one line, in other words is a line light sensor. The line-scan camera thus preferably does not have a two-dimensional area light sensor that has a multiplicity of lines. Owing to the line light sensor, the field of view of the line-scan camera is narrower than the field of view of a camera having an area light sensor. Line-scan cameras have the advantage that, with the same pixel number as an area light sensor, they have increased spatial resolution. In particular in the case of belt conveyors, where the packing unit moves owing to the belt conveyor, it is possible to generate two-dimensional optical imaged representations using a line-scan camera by generating optical imaged representations multiple times in a temporal sequence. Line-scan cameras have the further advantage that it is particularly easy to design the depth of field region of the sensor to be narrower than the width of the belt. Owing to the movement of the packing unit, an extremely short exposure time may be required, which is achievable by "opening up" the stop so that a lot of light can fall through the objective lens. This large stop aperture preferably leads to the small sharpness region. In connection with the gap in the grate and the configuration of the optical sensor as a line-scan camera, provision is preferably made that the gap in the grate of the sideguard and the line light sensor of the line-scan camera have corresponding orientations. The gap is preferably arranged such that the gap extends perpendicularly to the plane of the belt, and the line-scan camera is preferably arranged such that the line light sensor extends parallel to the gap.

In connection with the package unit capturing arrangement, provision is made according to a preferred example development that the package unit capturing arrangement includes an evaluation device for recognizing the identification mark. Provision is preferably made that the evaluation device is configured to recognize the identification marking of the package unit in an automated manner on the optical imaged representation generated by the optical sensor. The evaluation device can be, for example, a computer. The evaluation device is preferably connectable or is connected by communications technology to the optical sensor.

According to a further preferred example development, provision is made that the depth of field region and a focal plane of the sensor are set such that the identification marking of the packing unit that is optically captured by the sensor is recognizable by the evaluation device. Provision is made with particular preference that the focal plane of the sensor lies in the region of the packing unit. In this way, the packing unit and in particular the identification marking are imaged on the optical imaged representation sufficiently sharply so that the packing unit is recognizable in an automated manner by the evaluation device. Provision is made with further preference that the depth of field region of the sensor is so narrow that the grate is imaged in a blurred manner on the optical imaged representation. It is thus possible owing to the blur of the grate to recognize, despite the grate that is located, as viewed by the sensor, between the identification marking and the optical sensor, the identification marking on the optical imaged representation by the evaluation device. A person skilled in the art can implement these settings for the focal plane and the depth of field region for example using a small stop number and/or with an optical sensor having a long focal length.

With respect to the evaluation device, provision is made according to a preferred example development of the invention that the evaluation device includes an automated image recognition algorithm. The automated image recognition algorithm is preferably a neural network, a self-learning algorithm and/or artificial intelligence.

Provision can further be made that the evaluation device includes an image enhancing algorithm that computationally changes the optical imaged representations generated by the optical sensor. For example, contrast enhancement can be performed on the optical imaged representation. This can simplify the automated recognition of the identification marking of the package unit on the optical imaged representation by the evaluation device.

In this context, provision is made according to a preferred example development of the invention that the identification marking is configured as a barcode and/or QR code. A barcode and/or QR code has a high contrast, with the result that such an identification marking is recognizable particularly easy in an automated manner by the evaluation device.

Example aspects of the invention are further achieved by a method for the automated recognition of an identification marking of a package unit, wherein the package unit is transported with a belt conveyor along a conveying direction and the belt conveyor has, parallel to the conveying direction, a sideguard for preventing the package unit from falling off a belt of the belt conveyor, the sideguard is designed with a grate in a region. The method includes:

arranging an optical sensor laterally with respect to the belt and behind the grate on a side of the sideguard facing away from the belt such that the belt and the grate lie in a field of view of the sensor;

setting a depth of field region of the sensor such that the depth of field region is narrower than a width of the belt;

capturing the identification marking of the package unit with the sensor; and recognizing the identification marking with an evaluation device.

The method makes provision that the optical sensor is arranged outside the hazardous region of the belt conveyor. The hazardous region of the belt conveyor is delimited laterally by the sideguard. In this way, the method allows the sensor to be maintained without the need to stop the belt conveyor therefor because there is no need to enter the hazardous region for maintaining the sensor. The method is preferably realized by using the above-described package unit capturing arrangement. Arranging the sensor outside the hazardous region means that the grate in the sideguard also lies in the field of view of the sensor. In order to be able to recognize the identification marking with the evaluation device despite the grate being in the field of view of the sensor, the method includes setting the depth of field region of the sensor such that the depth of field region is narrower than the width of the belt. The result of this is that when focusing at the belt centre, the depth of field region of the sensor is limited to the width of the belt. In this way, the grate is located outside the depth of field region of the sensor and the identification marking can be recognized by the evaluation device despite the grate.

According to a further example development of the invention, provision is made that the method includes:

setting a focal plane of the sensor such that the focal plane of the sensor lies in a region of the package unit. The focal plane of the sensor, that is to say the plane whose points are represented in the optical imaged representation as image points and thus sharply, is thus preferably placed onto the region of the package unit. The region of the package unit is preferably the region on the belt of the belt conveyor in which the package unit is located. In other words, the optical sensor is used to focus at the region of the package unit. Preferably, focusing onto the package unit is effected and, with particular preference, onto the identification marking of the package unit. The identification marking of the package unit is thus located inside the depth of field region of the sensor and is imaged sufficiently sharply, so that the identification marking of the package unit can be subsequently recognized in an automated manner by the evaluation device. Alternatively, a variable focus can be used, wherein in such a case the closest distance of the focal region is preferably behind the grate, as seen from the sensor.

In this contest, provision is made according to a preferred example development of the invention that capturing the identification marking of the package unit with the sensor includes generating an optical imaged representation of the identification marking of the package unit with the sensor, and recognizing the identification marking with the evaluation device includes recognizing the identification marking on the optical imaged representation with the evaluation device. In other words, the optical imaged representation of the environment is generated by the optical sensor in the field of view of the sensor. Since the package unit and thus the identification marking of the package unit are located in the field of the view of the sensor, the identification marking is imaged onto the optical imaged representation. The evaluation device recognizes the identification marking of the package unit on the optical imaged representation in an automated manner, preferably using an image recognition algorithm.

According to a further preferred example development of the invention, provision is made that setting the depth of field region of the sensor such that the depth of field region is narrower than a width of the belt, and setting the focal plane of the sensor such that the focal plane of the sensor lies in the region of the package unit are performed such that the identification marking of the package unit that is optically captured by the sensor is recognizable for the evaluation device. This preferably means that for a package unit located in the belt centre, the identification marking is represented sufficiently sharply on the optical imaged representation and the grate is represented in a blurred manner.

Further embodiments and advantages of the method are discernible analogously to the package unit capturing arrangement described previously.

BRIEF DESCRIPTION OF THE DRAWINGS

Example aspects of the present invention will be explained in more detail below with reference to the accompanying drawings using preferred exemplary embodiments.

In the drawings,

FIG. 6 shows a flow chart with the steps of a method for the automated recognition of an identification marking of the package unit according to a preferred example embodiment of the invention.

DETAILED DESCRIPTION

Figure 1:
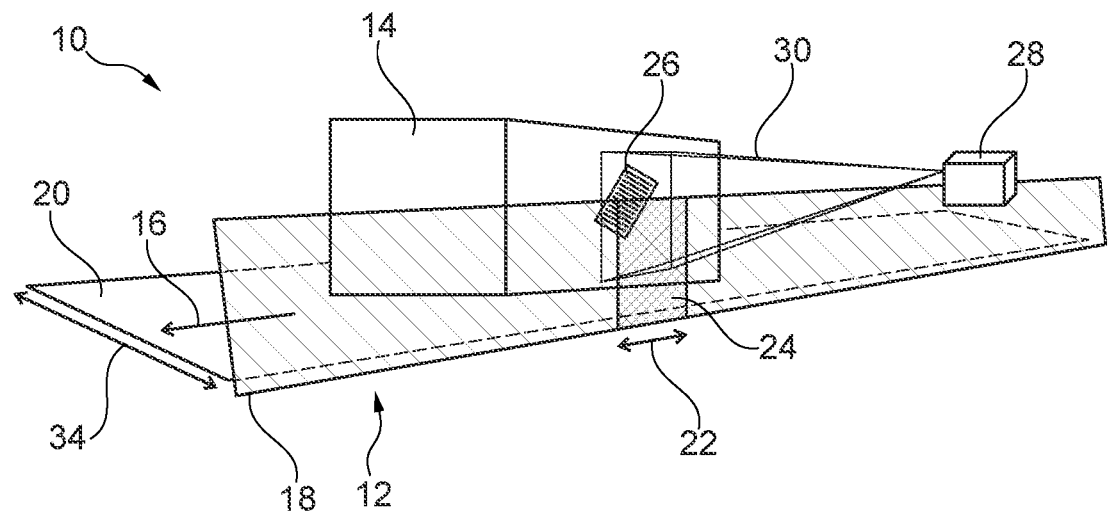
FIG. 1 shows a perspective view of a package unit capturing arrangement according to a preferred example embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
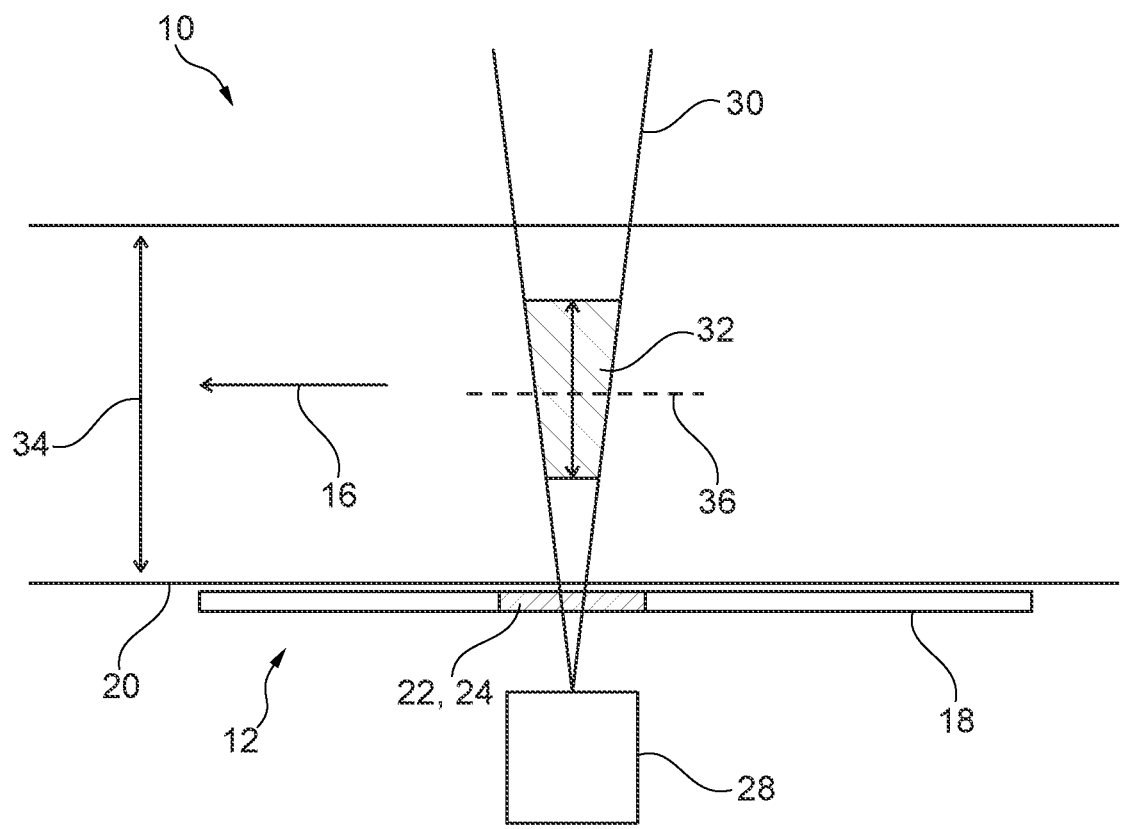
FIG. 2 shows a schematic plan view of the example package unit capturing arrangement from FIG. 1.

FIGS. 1 and 2 show a package unit capturing arrangement 1 according to a preferred example embodiment of the invention, wherein FIG. 1 shows a perspective illustration of the package unit capturing arrangement 10 and FIG. 2 shows a schematic plan view. The package unit capturing arrangement 10 includes a belt conveyor 12 for transporting a package unit 14 along a conveying direction 16. The belt conveyor 10 has a sideguard 18 parallel to the conveying direction 16. The sideguard 18 prevents the package unit 14 from falling off a belt 20 of the belt conveyor 12. The sideguard 18 is located laterally with respect to the belt 20 and extends at right angles relative to the plane of the belt 20. The sideguard 18 is furthermore designed with grate 24 in a region 22, but is non-transparent outside the region 22. The package unit 14 (illustrated only in FIG. 1) is located on the belt 20 of the belt conveyor 12 and has a barcode as an identification marking 26.

The package unit capturing arrangement 10 furthermore includes an optical sensor 28. The sensor 28 is arranged laterally with respect to the belt 20 and behind the grate 24 on a side of the sideguard 18 facing away from the belt 20. The sensor 28 is arranged such that the belt 20 and the grate 24 lie in a field of view 30 of the sensor 28. A depth of field region 32 (shown only in FIG. 2) of the sensor 28 is narrower than a width 34 of the belt 20. Owing to the fact that the depth of field region 32 of the sensor 28 is narrower than the width 34 of the belt 20, the depth of field region 32 is restricted to the belt 20 when focusing on a belt centre, that is to say when a focal plane 36 of the sensor 28 lies in the centre of the belt 20.

Figure 3:
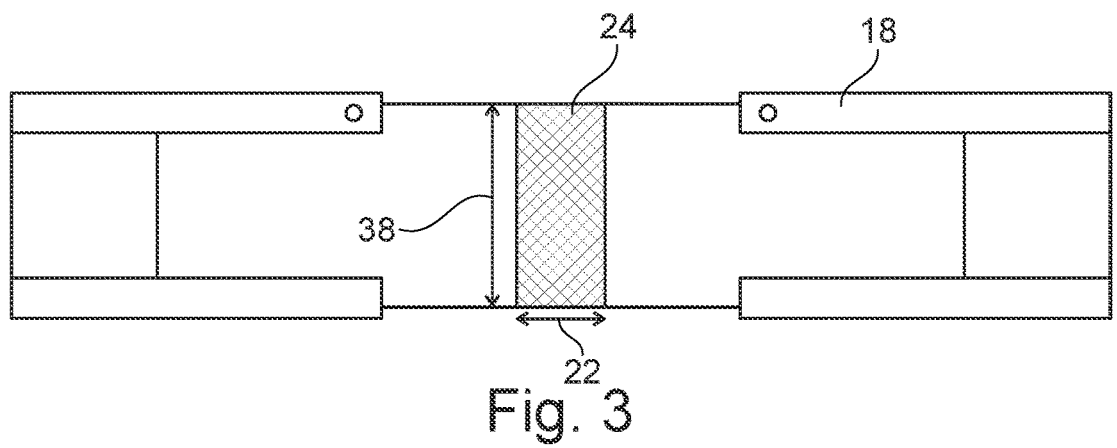
FIG. 3 shows a schematic illustration of a sideguard according to a preferred example embodiment of the invention.
Figure 4:
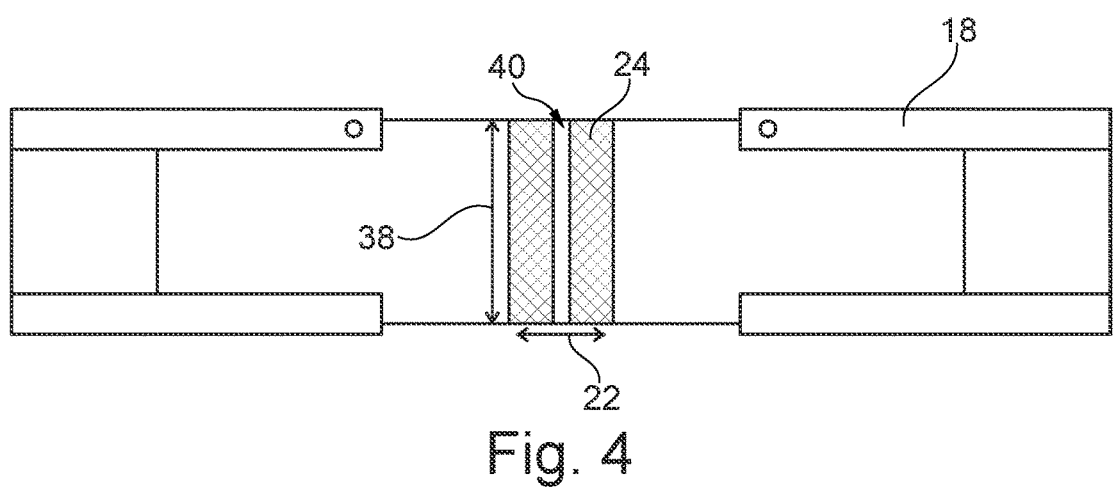
FIG. 4 shows a schematic illustration of the sideguard according to further preferred example embodiment of the invention.

FIGS. 3 and 4 show two preferred example embodiments of the sideguard 18 in a side view. In the first example embodiment in FIG. 3, the sideguard 18 has, analogously to the illustrations in FIGS. 1 and 2, the grate 24 in the region 22. The region 22 in this example embodiment is twenty centimetres (20 cm) long and has the same height as a height 38 of the sideguard 18. In the second example embodiment in FIG. 4, the grate 24 additionally has a gap 40. The gap 40 extends inside the grate 24 over the entire height 38 of the sideguard. The gap 40 further extends perpendicularly to the plane of the belt 20. In both embodiments, the grate 24 is designed as a wire mesh grate. The wires of the wire mesh grate in this embodiment are one-half centimetre (0.5 cm) thick.

Figure 5:
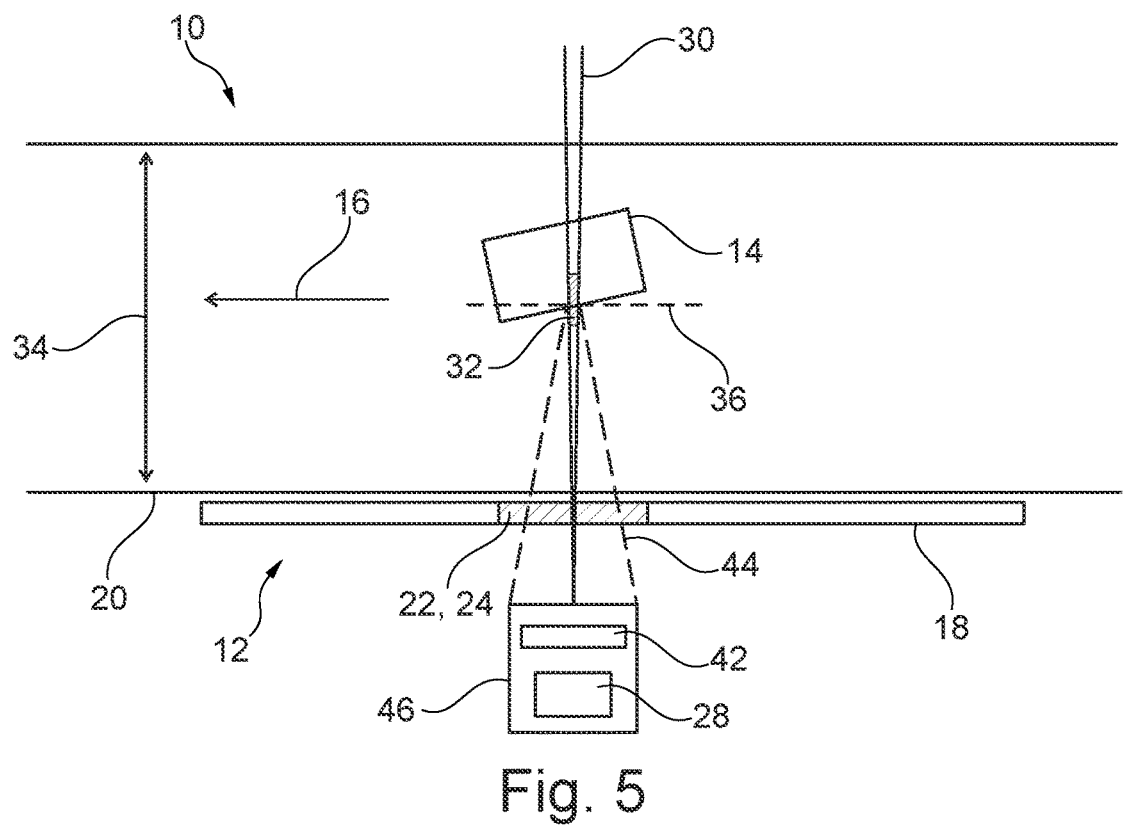
FIG. 5 shows a schematic plan view of the package unit capturing arrangement according to a further preferred example embodiment of the invention.

FIG. 5 shows a further example embodiment of the package unit capturing arrangement 10 from the same perspective as FIG. 2. In this example embodiment, the optical sensor 28 is designed as a line-scan camera. The field of view 30 of the line-scan camera is very narrow. Furthermore, the depth of field region 32 of the line-scan camera is narrower than thirty percent (30%) of the width 34 of the belt 20. In order to increase the quantity of light available, the optical sensor 28, or the line-scan camera, includes an illumination device 42. The illumination device 42 generates a light cone 44 that is focused onto the package unit 14. The package unit capturing arrangement 10 further includes an evaluation device 46. The evaluation device 46 is connected by communication technology to the sensor 28. The evaluation device 46 is configured to recognize the identification marking on the optical imaged representation generated by the sensor. For this purpose, the evaluation device 46 includes an automated image recognition algorithm, in the exemplary embodiment that is preferred here a self-learning algorithm.

FIG. 6 shows a flowchart of a method for the automated recognition of the identification marking 26 of the package unit 14. The method is performed using the package unit capturing arrangement 10 from FIG. 5. In a first step, the optical sensor 28 is arranged laterally with respect to the belt 20 and behind the grate 24 on a side of the sideguard 18 facing away from the belt 20 such that the belt 20 and the grate 24 lie in the field of view 30 of the sensor 28.

In a further step, the depth of field region 32 of the sensor 28 is set such that the depth of field region 32 is narrower than the width 34 of the belt 20. Next, the identification marking 26 of the package unit 14 is captured by the sensor 28 and the identification marking 26 is recognized by the evaluation device 46.

The exemplary embodiments described are merely examples that can be modified and/or supplemented in various ways within the scope of the claims. Every feature that was described for a specific exemplary embodiment can be used by itself or in combination with other features in any desired other exemplary embodiment. Every feature that was described for an exemplary embodiment of a specific category can correspondingly be used in an exemplary embodiment of a different category.

LIST OF REFERENCE SIGNS

Package unit capturing arrangement 10
Belt conveyor 12
Package unit 14
Conveying direction 16
Sideguard 18
Belt 20
Region 22
Grate 24
Identification marking 26
Optical sensor 28
Field of view of the sensor 30
Depth of field region 32
Width of the belt 34

Focal plane of the sensor 36
Height of the sideguard 38
Gap 40
Illumination device 42
Light cone 44
Evaluation device 46

The invention claimed is:

1. A package unit capturing arrangement, comprising:
a belt conveyor for transporting a package unit along a conveying direction, the package unit having an identification marking; and
an optical sensor,
wherein
the belt conveyor comprises a sideguard arranged parallel to the conveying direction, the sideguard configured for preventing the packing package unit from falling off a belt of the belt conveyor,
the sideguard comprises a grate in a region,
the sensor is arranged laterally with respect to the belt and behind the grate on a side of the sideguard facing away from the belt such that the belt and the grate lie in a field of view of the sensor, and
a depth of field region of the sensor is narrower than a width of the belt such that the identification marking of the package unit is optically capturable by the sensor.

2. The package unit capturing arrangement of claim 1, wherein the grate in the field of view of the sensor comprises a plurality of optically non-transparent structures, and the plurality of optically non-transparent structures do not cover more than twenty percent of the field of view of the sensor.

3. The package unit capturing arrangement of claim 1, wherein the grate in the field of view of the sensor comprises a plurality of optically non-transparent structures that have an extent less than two centimeters.

4. The package unit capturing arrangement of claim 1, wherein the grate in the field of view of the sensor does not comprise optically transparent material.

5. The package unit capturing arrangement of claim 1, wherein the grate in the field of view of the sensor defines a gap that interrupts the grate.

6. The package unit capturing arrangement of claim 1, wherein the optical sensor is a camera.

7. The package unit capturing arrangement of claim 1, further comprising an evaluation device configured for recognizing the identification marking.

8. The package unit capturing arrangement of claim 7, wherein the depth of field region and a focal plane of the sensor are set such that the identification marking of the package unit that is optically captured by the sensor is recognizable by the evaluation device.

9. The package unit capturing arrangement of claim 7, wherein the evaluation device comprises an automated image recognition algorithm.

10. The package unit capturing arrangement of claim 1, wherein the identification marking is configured as at least one of a barcode and a QR code.

11. A method for recognizing an identification marking of a package unit in an automated manner, the package unit transported with a belt conveyor along a conveying direction, the belt conveyor having a sideguard arranged parallel to the conveying direction, the sideguard preventing the package unit from falling off a belt of the belt conveyor, the sideguard having a grate in a region, the method comprising:
arranging an optical sensor laterally with respect to the belt and behind the grate on a side of the sideguard facing away from the belt such that the belt and the grate lie in a field of view of the sensor;
setting a depth of field region of the sensor such that the depth of field region is narrower than a width of the belt;
capturing the identification marking of the package unit with the sensor; and
recognizing the identification marking with an evaluation device.

12. The method of claim 11, further comprising setting a focal plane of the sensor such that the focal plane of the sensor lies in a region of the package unit.

13. The method of claim 11, wherein:
capturing the identification marking of the package unit with the sensor comprises generating an optical imaged representation of the identification marking of the package unit with the sensor; and
recognizing the identification marking with the evaluation device comprises recognizing the identification marking on the optical imaged representation with the evaluation device.

14. The method of claim 11, wherein setting the depth of field region of the sensor such that the depth of field region is narrower than the width of the belt and setting a focal plane of the sensor such that the focal plane of the sensor lies in a region of the package unit are performed such that the identification marking of the package unit that is optically captured by the sensor is recognizable for the evaluation device.

* * * * *